(12) United States Patent
Garrison et al.

(10) Patent No.: US 8,192,587 B2
(45) Date of Patent: *Jun. 5, 2012

(54) DEVICES, SYSTEMS, AND METHODS FOR RECYCLING PLASTIC

(75) Inventors: Craig W. Garrison, Portland, OR (US); Kevin Clark DeWhitt, Longview, WA (US); Lance Talley, Aberdeen, WA (US)

(73) Assignee: Agilyx Corporation, Tigard, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,097

(22) Filed: Oct. 13, 2011

(65) Prior Publication Data

US 2012/0034571 A1 Feb. 9, 2012

Related U.S. Application Data (63) Continuation of application No. 12/751,911, filed on Mar. 31, 2010.

(51) Int. Cl.
*B01D 3/00* (2006.01)
*B01L 3/00* (2006.01)
(52) U.S. Cl. ........ 202/239; 202/262; 202/266; 202/270; 422/547
(58) Field of Classification Search .......... 201/25; 585/241; 202/87, 131, 136, 216, 226, 239, 202/262, 266, 270; 422/530, 547
See application file for complete search history.

(56) References Cited

U.S. PATENT DOCUMENTS

| | | |
|---|---|---|
| 3,810,563 A | 5/1974 | La Mers |
| 4,164,484 A | 8/1979 | Tokuda |
| 4,168,942 A | 9/1979 | Firth |
| 4,220,480 A | 9/1980 | Dwan |
| 4,454,084 A | 6/1984 | Smith et al. |
| 5,240,656 A | 8/1993 | Scheeres |
| 5,269,947 A | 12/1993 | Baskis |
| 5,321,174 A | 6/1994 | Evans |
| 5,342,421 A * | 8/1994 | Breu ................... 96/279 |
| 5,359,061 A | 10/1994 | Evans |
| 5,360,553 A | 11/1994 | Baskis |
| 5,427,650 A | 6/1995 | Holloway |
| 5,481,052 A | 1/1996 | Hardman |
| 5,608,136 A * | 3/1997 | Maezawa et al. ........... 588/316 |
| 5,623,863 A | 4/1997 | Plantan |
| 5,666,878 A | 9/1997 | Taricco |
| 5,731,483 A | 3/1998 | Stabel |
| 5,744,668 A | 4/1998 | Zhou |
| 5,780,696 A | 7/1998 | Bauer |
| 5,811,606 A | 9/1998 | Yang |

(Continued)

FOREIGN PATENT DOCUMENTS

EP 0934995 * 8/1999

(Continued)

OTHER PUBLICATIONS

Office Action issued Dec. 19, 2011 in U.S. Appl. No. 12/814,391.

(Continued)

*Primary Examiner* — Nina Bhat
(74) *Attorney, Agent, or Firm* — Stoel Rives LLP; Samuel E. Webb (57) ABSTRACT

Systems for recycling waste plastic can include cartridges that are selectively sealable. Some cartridges can have elongated receptacles that improve heat transfer to plastic feedstock within the cartridges.

8 Claims, 11 Drawing Sheets

U.S. PATENT DOCUMENTS

| | | | |
|---|---|---|---|
| 5,820,736 A | 10/1998 | Bouziane et al. | |
| 5,821,396 A | 10/1998 | Bouziane | |
| 5,824,193 A | 10/1998 | Edwards | |
| 5,824,709 A | 10/1998 | Suka | |
| 5,836,524 A | 11/1998 | Wang | |
| 5,849,964 A | 12/1998 | Holighaus | |
| 5,973,217 A | 10/1999 | Hasmich | |
| 6,011,187 A | 1/2000 | Horizoe | |
| 6,046,370 A * | 4/2000 | Affolter et al. | 585/241 |
| 6,150,577 A | 11/2000 | Miller et al. | |
| 6,172,271 B1 | 1/2001 | Horizoe | |
| 6,190,542 B1 | 2/2001 | Comolli | |
| 6,288,296 B1 | 9/2001 | Miller | |
| 6,534,689 B1 | 3/2003 | Stankevitch | |
| 6,861,568 B1 | 3/2005 | Guffey et al. | |
| 7,626,062 B2 * | 12/2009 | Carner | 585/241 |
| 7,758,729 B1 * | 7/2010 | DeWhitt | 202/87 |
| 7,892,500 B2 | 2/2011 | Carner | |
| 2002/0070104 A1 * | 6/2002 | Nichols | 201/1 |
| 2002/0072640 A1 | 6/2002 | Nichols | |
| 2002/0156332 A1 | 10/2002 | Jiang | |
| 2003/0047437 A1 | 3/2003 | Stankevitch | |
| 2003/0050519 A1 | 3/2003 | Cheng | |
| 2004/0050678 A1 | 3/2004 | Takahashi et al. | |
| 2005/0132883 A1 | 6/2005 | Su et al. | |
| 2009/0062581 A1 | 3/2009 | Appel et al. | |
| 2010/0305372 A1 | 12/2010 | DeWhitt | |
| 2010/0320070 A1 | 12/2010 | DeWhitt | |
| 2011/0239541 A1 | 10/2011 | Garrison et al. | |
| 2012/0024686 A1 | 2/2012 | DeWhitt | |

FOREIGN PATENT DOCUMENTS

| | | |
|---|---|---|
| EP | 0934995 | 8/2009 |
| GB | 2231057 A | 11/1990 |
| WO | WO 2011/123145 | 10/2011 |
| WO | WO 2011/123272 | 10/2011 |

OTHER PUBLICATIONS

Interview Summary issued Jan. 23, 2012 in corresponding U.S. Appl. No. 12/751,911.
Office Action issued Dec. 16, 2011 in U.S. Appl. No. 12/825,086.
Office Action issued Dec. 16, 2011 in U.S. Appl. No. 13/273,089.
Interview Summary issued Jan. 20, 2012 in corresponding U.S. Appl. No. 13/273,089.
Office Action issued Dec. 19, 2008 in corresponding U.S. Appl. No. 11/510,489, now U.S. Patent No. 7,758,729.
Response to Dec. 19, 2008 Office Action filed Mar. 24, 2009 in corresponding U.S. Appl. No. 11/510,489, now U.S. Patent No. 7,758,729.
Office Action issued Jun. 23, 2009 in corresponding U.S. Appl. No. 11/510,489, now U.S. Patent No. 7,758,729.
Response to Jun. 23, 2009 Office Action filed Oct. 23, 2009 in corresponding U.S. Appl. No. 11/510,489, now U.S. Patent No. 7,758,729.
Office Action issued Dec. 8, 2009 in corresponding U.S Appl. No. 11/510,489, now U.S Patent No. 7,758,729.
Response to Dec. 8, 2009 Office Action filed Feb. 26, 2010 in corresponding U.S. Appl. No. 11/510,489, now U.S. Patent No. 7,758,729.
Notice of Allowance and Fees Due issued Mar. 8, 2010 in corresponding U.S. Appl. No. 11/510,489, now U.S. Patent No. 7,758,729.
Preliminary Amendment filed on Jun. 11, 2010 in corresponding U.S. Appl. No. 12/814,391, now US2010/0305372.
Preliminary Amendment filed on Oct. 14, 2011 in corresponding U.S. Appl. No. 12/814,391, now US2010/0305372.
Preliminary Amendment filed on Mar. 3, 2011 in corresponding U.S. Appl. No. 12/751,911, now US2011/0239542.
Office Action issued on Dec. 15, 2011 in corresponding U.S. Appl. No. 12/751,911, now US2011/0239542.
Heynderickx, et al. "A Shell and Tube Pyrolysis Reactor for Olefin Production," Ind. Eng. Chem. Res. 1002, vol. 31, 2080-2087.

* cited by examiner

DEVICES, SYSTEMS, AND METHODS FOR RECYCLING PLASTIC

CROSS-REFERENCE TO RELATED APPLICATIONS

This application is a continuation of U.S. patent application Ser. No. 12/751,911, filed Mar. 31, 2010, now allowed. The entire contents of the foregoing application are hereby incorporated by reference herein.

TECHNICAL FIELD

The present disclosure relates generally to the recycling of plastic. Certain embodiments relate more specifically to devices, systems, and methods for vaporizing plastic.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Certain embodiments of devices, systems, and methods described herein are configured for efficient recycling of plastic, such as by converting waste plastics into fuel and/or other commercially relevant materials. In some embodiments, a quantity of waste plastic feedstock can be introduced into a cartridge that includes a plurality of elongated receptacles. The cartridge can be introduced into a heating plenum such that at least the elongated receptacles of the cartridge are exposed to a heated fluid (e.g., heated air). Various properties of the elongated receptacles, such as their surface-area-to-volume ratio, their thicknesses, the material or materials of which they are formed, and/or their geometrical arrangement can assist in efficient transfer of heat to the contents of the cartridge. Heating of the cartridge can cause various components of the plastic feedstock to transition into gases, which can be removed from the cartridge for further processing. Various advantageous features of embodiments of the cartridges, systems in which the cartridges may be used, and methods that are compatible with the cartridges will be apparent from the disclosure that follows.

Figure 1:
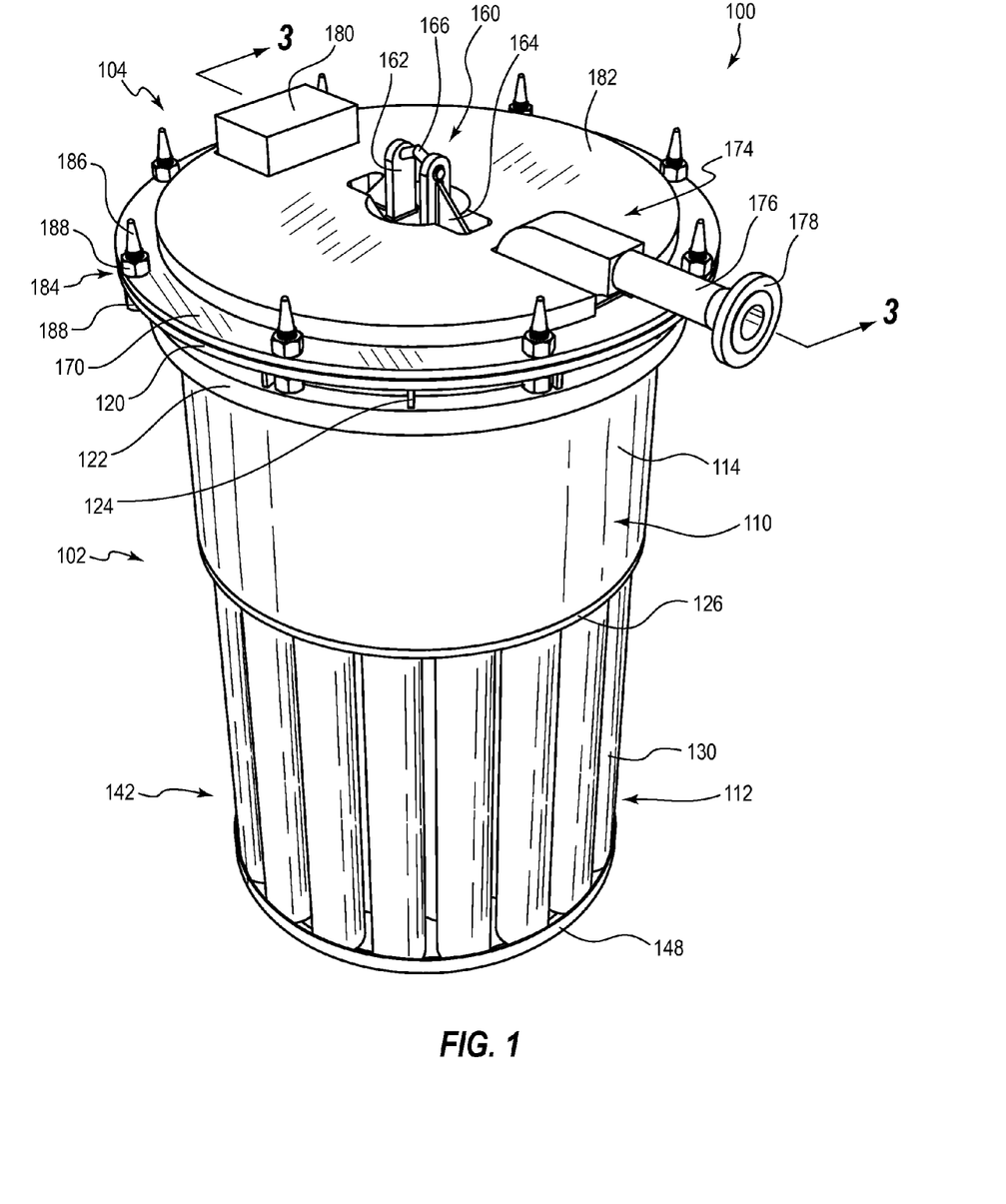
FIG. 1 is a perspective view of an embodiment of a cartridge configured for use in recycling plastic.
Figure 2:
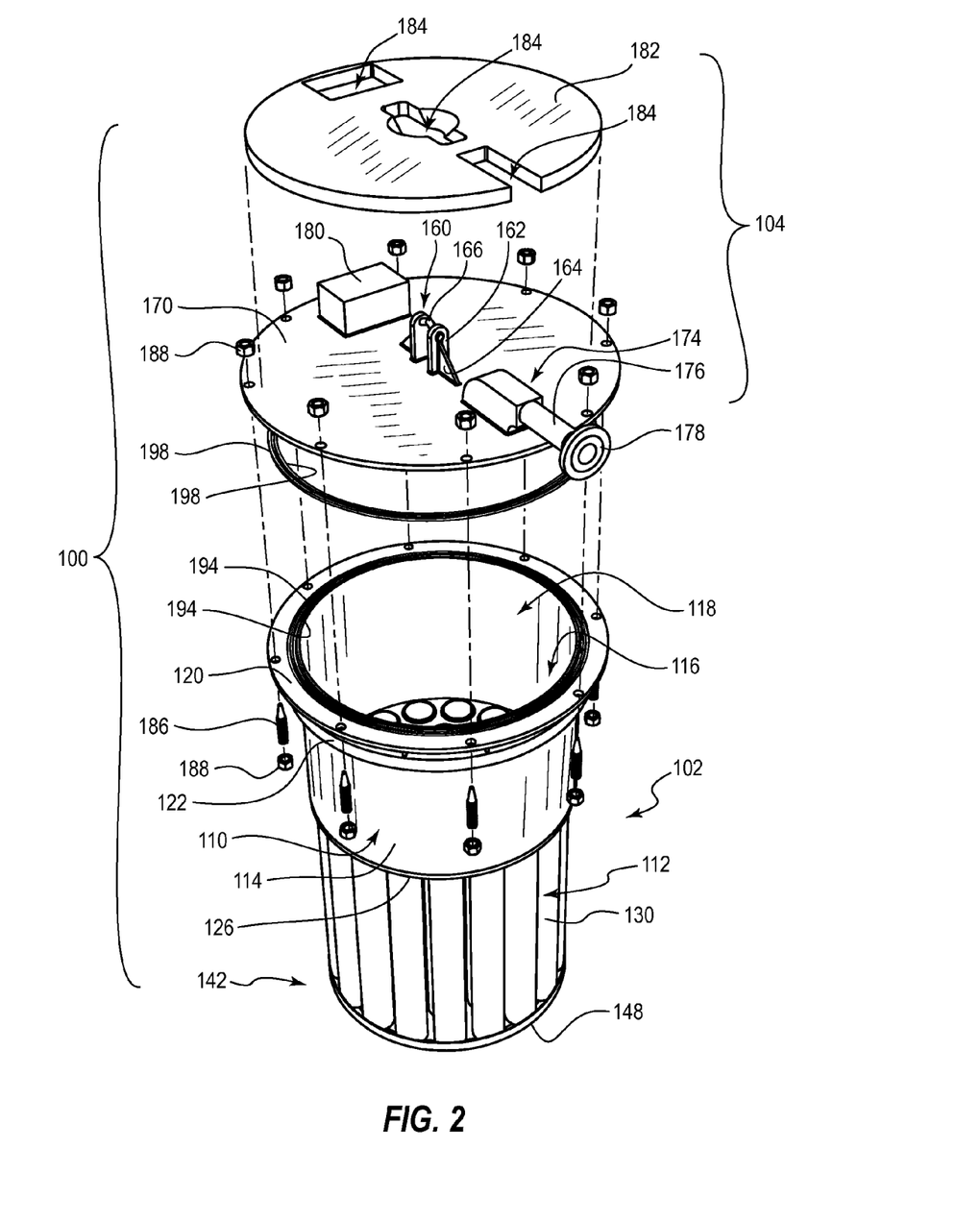
FIG. 2 is an exploded perspective view of the cartridge of FIG. 1.
Figure 3:
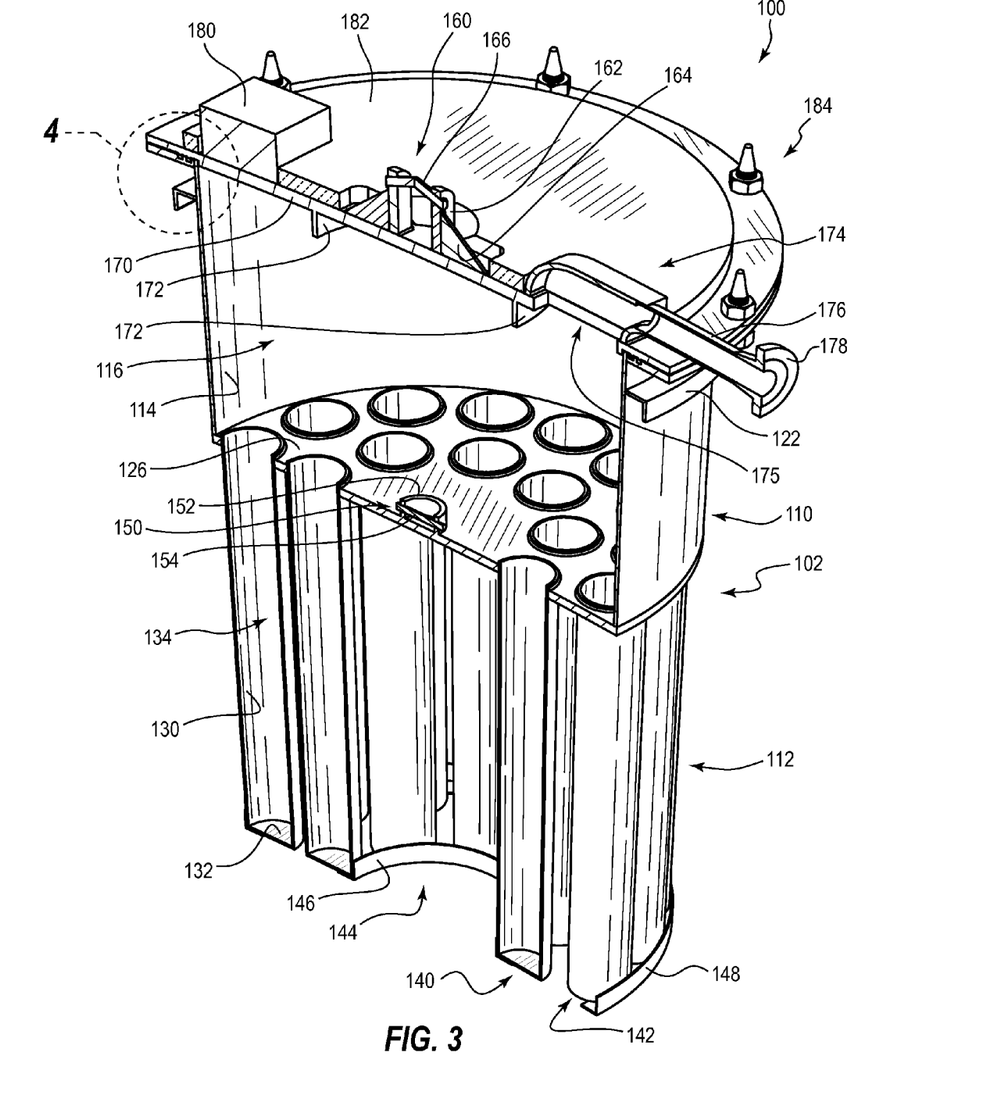
FIG. 3 is a cross-sectional perspective view of the cartridge of FIG. 1.

FIGS. 1-3 illustrate an embodiment of a cartridge 100 that can be used in any of a variety of systems for recycling plastic. As discussed further hereafter, the cartridge 100 can be configured to be opened so as to receive a plastic feedstock 101 (see FIG. 5) therein and closed so as to form a fluid-tight seal, which can allow for a controlled environment within the cartridge 100. The cartridge 100 can be particularly well-suited for heating of the plastic feedstock 101.

The cartridge 100 can include a base 102 and a cover or lid 104. In the illustrated embodiment, the lid 104 is fully separable from the base 102. Removal of the lid 104 from the base 102 can open the cartridge 100 to permit a plastic feedstock 101 to be introduced therein. The lid 104 is described further below.

The base 102 can include a body 110 and a plurality of receptacles 112, which may also be referred to as legs, columns, crucibles, or candles. The body 110 can include a sidewall 114 that at least partially defines a headspace, upper chamber, or upper cavity 116. The sidewall 114 can define any suitable shape. In the illustrated embodiment, the sidewall 114 is cylindrical and can be formed from a length of pipe. In the illustrated embodiment, an upper end of the sidewall 114 defines a selectively sealable opening 118 (see FIG. 2) of the base 102 through which plastic feedstock 101 can be introduced into the cartridge 100. A rim 120 can extend radially outwardly from the upper end of the sidewall 114 and may be configured to cooperate with the lid 104 to form a fluid-tight seal. A support member 122 also can extend outwardly from the upper end of the sidewall 114, and may be positioned slightly below the rim 120. One or more reinforcing members or gussets 124 can extend between the support member 122 and the rim 120 (see FIGS. 1 and 7). The gussets 124 can reinforce the support member 122 and prevent distortion thereof in an upward direction when the support member 122 is used to bear the weight of the cartridge 100 and its contents.

With continued reference to FIGS. 1-3, a base wall 126 can be positioned at a bottom end of the sidewall 114 and can define a lower end of the upper cavity 116. The receptacles 112 can extend downwardly from the base wall 126 and away from the body 110. Each of the receptacles 112 can include a sidewall 130 and a base wall 132 connected to a bottom end thereof. The sidewalls 130 can define any suitable shape. In the illustrated embodiment, the sidewalls 130 define elongated, substantially cylindrical columns, which can be formed from any suitable tubing. An upper end of the sidewall 130 can be connected to the base wall 126 of the body 110. The sidewall 130 and the base wall 126 of each receptacle 112 can define a lower cavity (see FIG. 3) that is in fluid communication with the upper cavity 116 of the body 110. Fluid thus can readily move between the upper cavity 116 and the lower cavities 134. The term "fluid" is used herein in its ordinary sense, and includes one or more gases, one or more liquids, and/or a combination thereof. Accordingly, fluid communication between the upper cavity 116 and the lower cavities 134 can permit melted plastic feedstock 101 to flow from the upper cavity 116 into the lower cavities 134, and can permit vaporized plastic feedstock 101 to flow from the lower cavities 134 into the upper cavity 116.

The receptacles 112 can be arranged in any suitable manner. In the illustrated embodiment, the receptacles 112 are arranged in concentric circular rings 140, 142. The inner ring 140 defines an open volume 144. In the illustrated embodiment, the open volume 144 is shaped substantially as a cylinder and extends longitudinally between a bottom plane of the cartridge 100 and a bottom surface of the base wall 126 of the body 110. As further discussed below, the open volume 144 can assist in rapidly heating the contents of the inner ring 140 of receptacles 112.

The receptacles 112 can be coupled with one or more runners or reinforcing members 146, 148. Each of the reinforcing members 146, 148 can couple two or more of the receptacles 112 to each other, which can reduce the effects if or when torque is applied to the lower ends of the receptacles 112. In the illustrated embodiment, the inner and outer reinforcing members 146, 148 couple each of the receptacles 112 of the inner and outer rings 140, 142, respectively, to each other. The reinforcing members 146, 148 can extend underneath the base walls 132 of the receptacles 112 so as to elevate the receptacles 112 when the cartridge 100 is at rest on a substantially planar surface. More generally, the cartridge 100 can stand upright on the receptacles 112 and/or on the reinforcing members 146, 148. Such an arrangement can assist in transport of embodiments of the cartridge 100. For example, in some embodiments, a cartridge 100 may be placed on an industrial skid (not shown) with its reinforcing members 146, 148 facing down, and the skid can be readily moved as desired.

As shown in FIG. 3, the base 102 can include a lift attachment 150 that can be used to hoist the base 102 when the cartridge 100 is in an open configuration (e.g., when the lid 104 is removed from the base 102 or otherwise opened). In the illustrated embodiment, the lift attachment 150 includes a pipe socket 152 that extends upwardly from a center of the base wall 126 of the body 110. A pin 154 extends transversely through the pipe socket 152 and can be coupled with an attachment device (e.g., a hook) of a lifting device (e.g., a crane).

With reference again to FIGS. 1-3, the lid 104 likewise can include a picking eye or lift attachment 160, which can be used to hoist the entire cartridge 100 when it is in a closed configuration (e.g., when the lid 104 is sealed to the base 102). The lift attachment 160 can include two upward extending plates 162, which each can be reinforced in a transverse or radially outward direction by a gusset 164. A pin 166 extends transversely through the plates 162 and can be coupled with an attachment device (e.g., a hook) of a lifting device (e.g., a crane). In the illustrated embodiment, the lift attachment 160 is attached to a base plate 170 of the lid 104.

The base plate 170 can define an outer diameter or shape that is substantially equal to an outer diameter or shape of the rim 120 of the base (see FIG. 1). In the illustrated embodiment, the base plate 170 defines a substantially circular disk. The base plate 170 can be reinforced in the vicinity of the lift attachment 160. For example, one or more gussets 172 can extend downwardly from an underside of the base plate 170 about the lift attachment 160 (see FIG. 2). Only a circular gusset 172 is shown in FIG. 3, but other or additional gussets may be used, which may extend in a radial direction (e.g., radially outwardly and/or inwardly from the circular gusset 172).

With continued reference to FIGS. 1-3, an access port or evacuation port 174 can be coupled with the base plate 170. The evacuation port 174 can define an opening 175 (see FIG. 3) through the base plate 170 so as to be in fluid communication with the upper cavity 116 when the lid 104 is coupled to the base 102. A fluid conduit or neck 176 can lead away from the upper cavity 116, and can extend outwardly beyond an outer edge of the base plate 170. A flange 178 can be provided at a proximal end of the neck 176, which can assist in coupling the evacuation port 174 with a vacuum system.

A counterbalance or counterweight 180 can be coupled with the base plate 170, and can be positioned opposite the evacuation port 174. The counterweight 180 can assist in maintaining the cartridge 100 in a substantially vertical or upright orientation when the cartridge 100 is being hoisted via the lift attachment 160. Similarly, the counterweight 180 can inhibit tipping of the cartridge 100 when the cartridge 100 stands uprightly on the receptacles 112. In some embodiments, the counterweight 180 can assist in providing a substantially uniform force about a periphery of the body 110 along a lower edge or underside of the support member 122, when the cartridge 100 is coupled with a heating plenum, which can aid in forming a liquid-tight seal with the heating plenum.

The lid 104 can include an insulation layer 182, which can comprise any suitable material. For example, in some embodiments, the insulation layer 182 comprises calcium silicate. As further discussed below, in some embodiments, the lid 104 of the cartridge 100 can be external to a heating plenum when the cartridge 100 is coupled therewith. Accordingly, the insulation layer 182 can advantageously inhibit or prevent heat from escaping from the cartridge 100 thereby. As shown in FIG. 2, in the illustrated embodiment, the insulation layer 182 includes a plurality of openings 184 through which the counterweight 180, the lift attachment 160, and the evacuation port 174 can project (see FIG. 1). In other or further embodiments, insulation may be provided over the tops of the counterweight 180, the lift attachment 160, and/or the evacuation port 174 during heating of the cartridge 100 to further prevent heat losses. In some embodiments, a cover (not shown) is provided over the insulation layer 182. The cover can comprise any suitable material, such as machine steel, and can comprise any suitable shape, such as a disk-like plate, which may include openings that correspond or align with the openings 184. The cover can serve to protect the insulation layer 182, such as from inadvertent scraping during hoisting of the cartridge 100 or otherwise.

The lid 104 can be joined to the base via a plurality of attachment mechanisms 184. Any suitable attachment mechanism 184 is contemplated. In the illustrated embodiment, each attachment mechanism 184 includes a threaded pin 186 and two nuts 188. Each threaded pin 186 can be advanced through the rim 120 of the base 102 and through the base plate 170 of the lid 104, and the nuts 188 can be tightened on either side of the rim 120 and the base plate 170.

Figure 4:
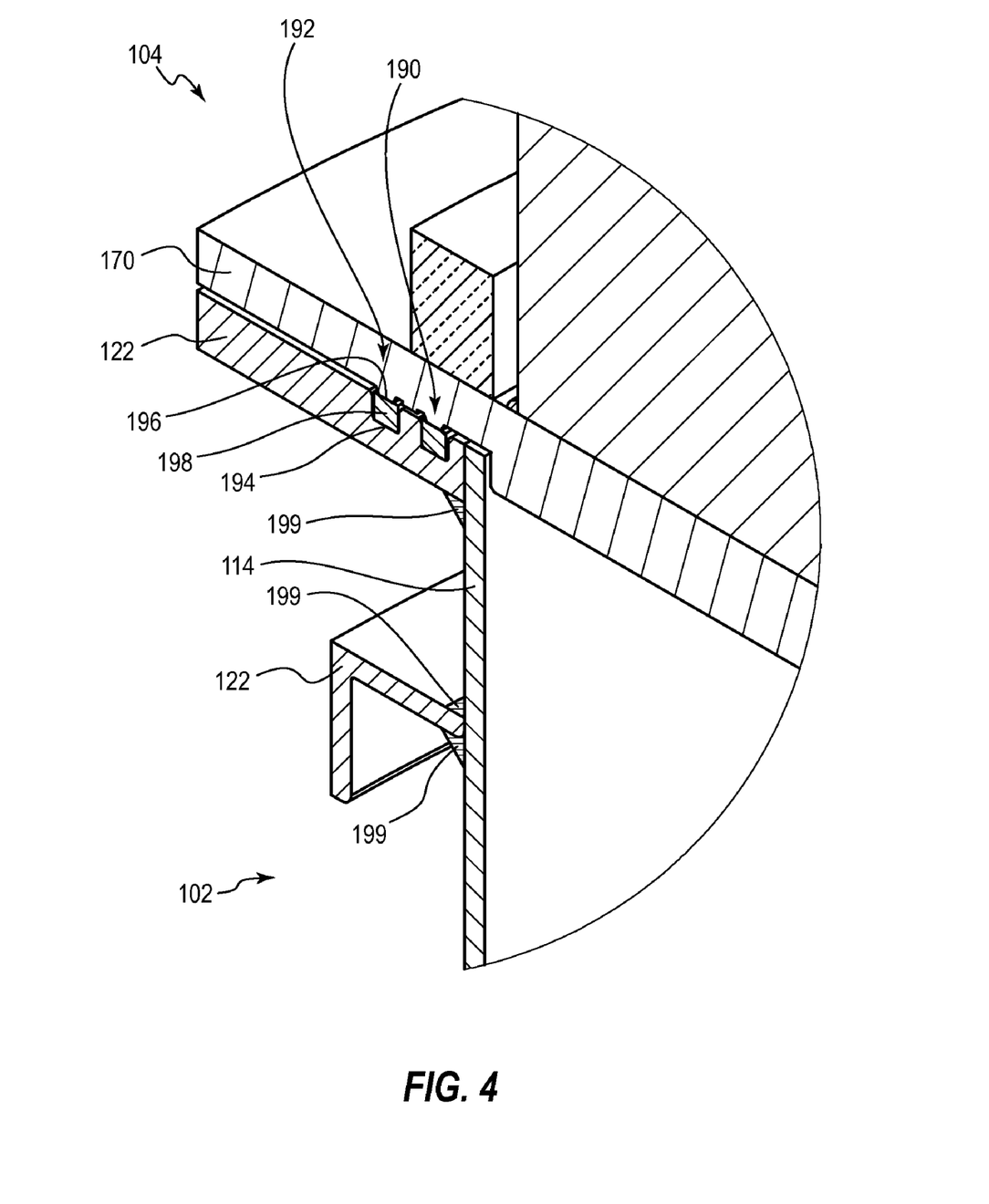
FIG. 4 is an expanded view of a portion of the cartridge of FIG. 1 taken along the view line shown in FIG. 3.

With reference to FIGS. 2-4, securing the attachment mechanisms 184 in place can assist in creating one or more fluid-tight seals 190, 192. One of the rim 122 and the base plate 170 can define one or more channels 194 that are each sized to receive a ring of compression packing 198 therein. The other of the rim 122 and the base plate 170 can define one or more protrusions 196 that are configured to compress the compression packing 198 within the channels 194. Other suitable arrangements for providing one or more fluid-tight seals 190, 192 are also possible.

With continued reference to FIG. 4, it is noted that various components of the cartridge 100 can be joined with each other in any suitable manner. In some embodiments, different components may be die cast as a unitary piece. In the illustrated embodiment, various components are joined to each other via welds 199, which are shown as fillet welds.

Figure 5:
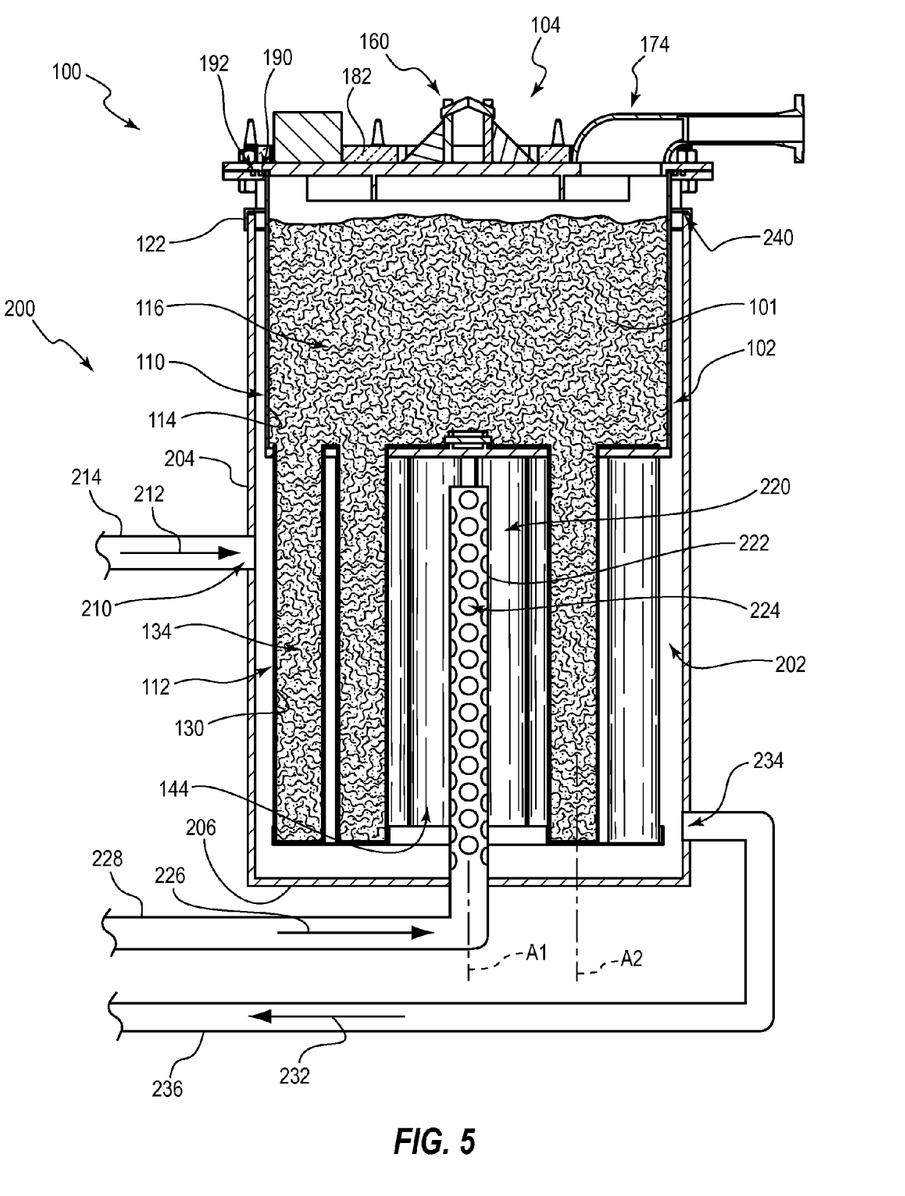
FIG. 5 is a cross-sectional elevation view of the cartridge of FIG. 1 having a quantity of plastic feedstock therein and shown positioned in an embodiment of a heating plenum.

FIG. 5 illustrates an embodiment of the cartridge 100 inserted in an embodiment of a heating plenum 200. The cartridge 100 contains a quantity of plastic feedstock 101 therein that can be heated by fluid that is circulated within the heating plenum 200. As further discussed below, the heated plastic feedstock 101 can be melted and vaporized.

A variety of configurations are possible for the heating plenum 200. The heating plenum 200 can define a heating chamber 202 within which a heated fluid (e.g., heated air) can be circulated. In the illustrated embodiment, the heating plenum 200 includes a sidewall 204 and a base wall 206 that cooperate to define the heating chamber 202. In the illustrated embodiment, the sidewall 204 is substantially cylindrical and is relatively close to the receptacles 112. In other embodiments, the sidewall 204 can be spaced from the receptacles 112 by a greater distance, and it can define any suitable shape.

The heating plenum 200 can include one or more side entrance fluid ports 210, which can be positioned in the sidewall 204. Heated fluid 212 can be transported from any suitable heat source (e.g., a furnace or other burner system) to the fluid port 210 via any suitable conduit path 214, and the fluid port 210 can deliver the heated fluid 212 into the heating chamber 202. In the illustrated embodiment, the fluid port 210 is shown delivering the heated fluid 212 at a roughly perpendicular angle relative to a plane that is tangent to the sidewall 204. Stated otherwise, the heated fluid 212 is directed toward an axial center of the sidewall 204. In other embodiments, the fluid port 210 can direct the heated fluid 212 at a variety of other angles relative to the sidewall 204. The fluid port 210 can introduce the heated fluid 212 in an inward direction such that the heated fluid initially moves away from the sidewall 204 when within the heating plenum 200. For example, although it may be said that the heated fluid 212 shown in FIG. 5 is being directed toward a portion of the sidewall 204 that is opposite the fluid port 210, the fluid 212 initially moves away from the portion of the sidewall 204 at which the fluid port 210 is positioned.

In some embodiments, the outer receptacles 112 can hinder delivery of the heated fluid 212 to the inner receptacles 112. For example, since the outer receptacles 112 are filled with plastic feedstock 101 that may have insulating properties, the heated fluid 212 may be at a lower temperature when it eventually reaches the inner receptacles 112.

In some embodiments, the heating plenum 200 includes one or more additional fluid ports that are configured to deliver heated fluid initially to the inner receptacles 112. For example, the heating plenum 200 can include a base entrance fluid port 220, which can be at or can extend through the base wall 206 at a position that is distanced from the sidewall 204. In the illustrated embodiment, the fluid port 220 extends into the open volume 144 defined by the inner receptacles 112. Stated otherwise, the fluid port 220 can be positioned among or encompassed by the receptacles 112.

The fluid port 220 can include a sidewall 222 that defines a plurality of openings 224. Heated fluid 226 can be transported from any suitable heat source (e.g., a furnace or other burner system) to the fluid port 220 via any suitable conduit path 228, and the fluid port 220 can deliver the heated fluid 226 into the heating chamber 202. In the illustrated embodiment, the fluid port 220 delivers the heated fluid 226 in a transverse direction or radially outwardly. More generally, the heated fluid 226 can be directed in an outward direction such that it moves toward the sidewall 204 upon exiting the fluid port 220. In moving toward the sidewall 204, the heated fluid 226 can come into contact with the inner receptacles 112 and can transfer heat thereto.

In the illustrated embodiment, the sidewall 222 of the fluid port 220 defines a longitudinal axis A1 that is substantially vertical. One or more of the inner receptacles 112 each may define a longitudinal axis A2 that is substantially parallel to the longitudinal axis A1 of the fluid port 220. Such an arrangement can provide for relatively even heating along a vertical extent of the receptacles 112. In some instances, vertically oriented receptacles 112 can encourage the flow of melted plastic feedstock 101 from the body 110 into the receptacles 112 for heating.

Fluid 232 can be removed from the heating plenum 200 via an exit port 234 to maintain proper circulation of heated fluid within the heating plenum 200. The fluid 232 can be returned to a heat source or otherwise vented via any suitable conduit path 236.

The cartridge 100 can cooperate with the heating plenum 200 to form a fluid-tight seal 240, which can prevent heated fluid from exiting the heating plenum 200 thereby. In the illustrated embodiment, the support member 122 can cooperate with the sidewall 122 to form the seal 240. For example, in some embodiments, one or more rings of compression packing such as the compression packing 198 described above may be positioned at an upper end of the sidewall 204 of the heating plenum 200 and may be compressed by the support member 122 so as to form a fluid-tight seal. In the illustrated embodiment, the sidewall 114 of the body 110 is relatively close to the sidewall 204 of the heating plenum 200 when the cartridge 100 is coupled with the heating plenum 200. However, sufficient room is provided between the sidewalls 114, 204 to allow heated fluid to migrate between them so as to heat the contents of the upper cavity 116. In other embodiments, the sidewalls 114, 204 may touch or be relatively close to each other such that little or no heated fluid passes between them.

In the illustrated embodiment, the receptacles 112 are suspended above the base wall 206 of the heating plenum 200 when the cartridge 100 is coupled with the heating plenum 200. Such an arrangement can permit heated fluid to contact the bottom ends of the receptacles 112 to assist in heating the contents thereof.

In the illustrated embodiment, the lid 104 is positioned outside of the heating plenum 200 when the cartridge 100 is received within the heating plenum 200. As previously mentioned, the insulation layer 182 can aid in preventing heat from escaping from portions of the cartridge 100 that are not within the heating plenum 200.

Various illustrative methods of using the cartridge 100 in recycling plastics will now be described. In certain embodiments, the lid 104 is removed from the base 102 to place the cartridge 100 in an open configuration in which a quantity of plastic feedstock 101 can be received therein. After introducing plastic feedstock 101 into the cartridge 100 in any suitable manner (e.g., via one or more of a screw auger or other electromechanical system, a gravity feed system, a vacuum system, or a blower system), the lid 104 is coupled with the body 102 so as to form the one or more fluid-tight seals 190, 192. The cartridge 100 thus may hold a vacuum within its cavities 116, 134.

The cartridge 100 can be prepared to permit the plastic feedstock 101 to undergo pyrolytic cracking when heated. For example, heating of the plastic feedstock 101 may take place in the absence of oxygen within the cartridge 100 so as to prevent combustion (as a potential reaction pathway) from occurring. Therefore, in some embodiments, oxygen is evacuated from the cartridge 100 via the evacuation port 174. In other or further embodiments, the reactor may be purged with an inert gas, such as nitrogen. The purging may take place prior to sealing the lid 104 in place and/or may be performed via the evacuation port 174 after the lid 104 has been sealed in place.

The charged or loaded cartridge 100 may be stored in any suitable manner or used directly. In some embodiments, the cartridge 100 is stored on a skid for transport. The cartridge 100 may be stored standing upright on the receptacles 112 or may be suspended on a storage rack via the support member 122. The cartridge 100 can be hoisted via the lift attachment 160 and inserted into the heating plenum 200. FIG. 5 shows the cartridge 100 at this stage—the cartridge 100 is within the heating plenum 200, but the plastic feedstock 101 within the cartridge 100 has not yet been melted.

Heated fluids can be circulated within the plenum 200 in any of the manners described above so as to melt the plastic feedstock 101 and convert it into one or more vapors or gases. A vacuum may be applied via the evacuation port 174 so as to remove the one or more vapors or gases from the cartridge 100. The removed gases can be processed as desired. In some embodiments, constituents of the gases are condensed, and different components of the gases are separated or purified into commercially relevant materials, such as a crude hydrocarbon material.

Upon removal of all of the desired gases from the cartridge 100, the cartridge 100 can be removed from the heating plenum 200. The cartridge 100 can be replaced with an additional cartridge 100 that is charged with a plastic feedstock 101, and the foregoing processes can be repeated. The successive coupling, heating, removal, and replacement of a series of charged cartridges 100 can be referred to as a continuous batch process.

In one illustrative example of a continuous batch process, a system can comprise four heating plenums 200 each configured to receive a single cartridge 100 therein. A first cartridge 100 can be inserted in a first heating plenum 200 and heated for a first period of time; a second cartridge 100 can be inserted in a second heating plenum 200 at the end of the first period, and both the first and second cartridges 100 can be heated for a second period; a third cartridge 100 can be inserted in a third heating plenum 200 at the end of the second period, and the first, second, and third cartridges 100 can be heated for a third period; and a fourth cartridge 100 can be inserted in a fourth heating plenum 200 at the end of the third period, and the first, second, third, and fourth cartridges 100 can be heated for a fourth period. Prior to the end of the fourth period, a filled fifth cartridge 100 can be positioned near the first heating plenum 200. By the end of the fourth period, the first cartridge 100 may be substantially emptied or otherwise cleared of the materials of interest. Thus, at the end of the fourth period, the first cartridge 100 can be removed from the first heating plenum 200 and the fifth cartridge can be introduced into the first heating plenum 200 in its place. The fifth, second, third, and fourth cartridges 100 can then be heated for a fifth period of time. Replacement of a single cartridge 100 at the end of a heating period can continue in series for each of the second, third, and fourth plenums 200, respectively, and can cycle through to the first heating plenum 200 once again. In other embodiments, more or fewer heating plenums 200 and cartridges 100 may be used.

Measures may be taken to prevent or reduce heat losses when a cartridge 100 is removed from a plenum 200 and replaced. For example, in some embodiments, a burner is turned off just prior to removal of a cartridge 100, and air can be drawn down into the heating plenum 200 as the cartridge 100 is removed and replaced. The burner can then be turned on again once the new cartridge 100 is in place.

With continued reference to FIG. 5, the plastic feedstock 101 can comprise waste plastics of one or more suitable varieties, which may be in a ground or chipped form. In certain embodiments, the plastic feedstock 101 can have a relatively small density when it is in an un-melted state, as compared with the same plastic feedstock 101 when it is in a melted state. Stated otherwise, the plastic feedstock 101 can reduce in volume when melted. In some cases, these differences in density or volume can result from air being trapped in the interstices of the ground or chipped plastic of the un-melted plastic feedstock 101, which can separate (e.g. rise away) from the plastic feedstock 101 as the feedstock is melted. In some embodiments, the relationship between the un-melted and melted densities may be unknown beforehand. In other embodiments, the relationship between the un-melted and melted densities may be estimated, modeled, or predicted to fall within a range of values. In still other embodiments, the relationship between the un-melted and melted densities may be established or predetermined such that an amount by which the plastic feedstock 101 reduces in volume is known (e.g., within a finite range of uncertainty or margin of error). Determining an estimated or predetermined volume reduction of the plastic feedstock 101 due to melting can, in some instances, aid in selecting various parameters of a cartridge 100. The parameters can be altered, adjusted, and/or optimized based on the desired performance of the cartridge 100.

Figure 6:
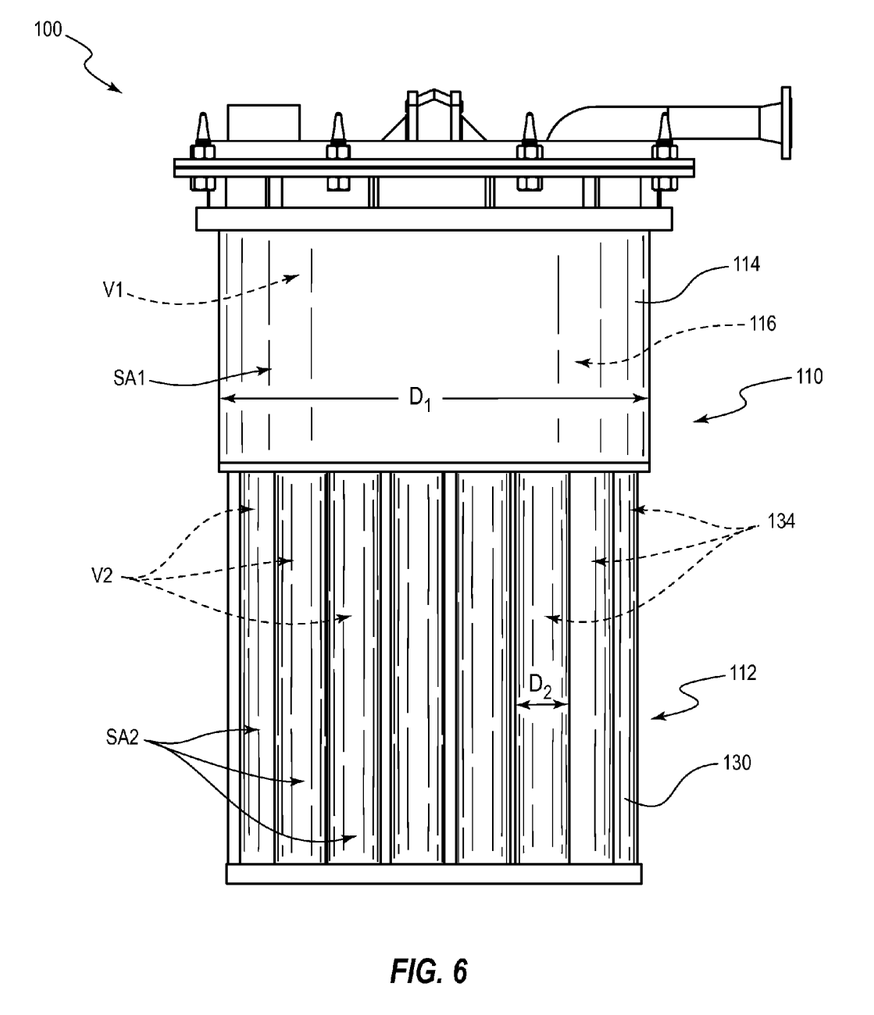
FIG. 6 is an elevation view of the cartridge of FIG. 1.

As shown in FIG. 6, the upper cavity 116 of the body 110 can define an internal volume V1, and the lower cavities 134 of the receptacles 112 can define an internal volume V2. The volumes V1, V2 can be sufficiently large to receive a sufficient amount of un-melted plastic feedstock 101 therein such that when the plastic feedstock 101 is melted, the plastic feedstock 101 fills a significant portion of the volume V2. In various embodiments, the melted plastic feedstock fills at least about 50 percent, at least about 60 percent, at least about 75 percent, at least about 90 percent, or the entire volume V2. In other or further embodiments, the melted plastic feedstock 101 fills no more than about 20 percent, no more than about 10 percent, or no more than about 5 percent of the volume V1 when the volume V2 has been filled with melted plastic feedstock 101. In some embodiments, configuring the cartridge 100 such that the melted plastic feedstock 101 is primarily contained within the volume V2 of the receptacles 112 can result in efficient vaporization of the plastic feedstock 101.

In other or further embodiments, the volumes V1 and V2 can be adjusted or selected such that both volumes are substantially filled prior to melting of the plastic feedstock 101. Stated otherwise, a balancing or optimization can be performed in which little or no excess space is present within the cartridge 100 when it is filled with plastic feedstock 101 and the lid 104 is sealed in place, yet when the plastic feedstock 101 is melted, it is primarily contained within the receptacles 112 (e.g., it fills the receptacles 112, and in some cases, a portion of the body 110, according to the percentages recited above).

It can be desirable to constrain the melted plastic feedstock 101 primarily (or entirely) to the receptacles 112 due to the enhanced heat transfer that can occur within them, as compared with the body 110. For example, in the illustrated embodiment, the body 110 can define an external surface area SA1 and the plurality of receptacles 112 together can define an external surface area SA2. A ratio comparing the surface area SA2 to the volume V2 of the receptacles 112 can be greater than a ratio comparing the surface area SA1 to the volume V1 of the body, which can yield more effective heat transfer to the contents of the receptacles 112. In various embodiments the ratio of SA2 to V2 is no less than about 5 times, no less than about 10 times, no less than about 20 times, no less than about 30 times, or no less than about 50 times, no less than about 75 times, or no less than about 100 times greater than the ratio of SA1 to V1. The external surface area defined by any single receptacle 112 may be the same as or different from the external surface area defined by other receptacles 112.

A transverse dimension D1 (e.g., a diameter) defined by the body 110 may be significantly larger than a transverse dimension D2 (e.g., a diameter) defined by a receptacle 112. In various embodiments, the transverse dimension D1 of the body 110 is no less than about 5 times, no less than about 8 times, no less than about 10 times, or no less than about 15 times as large as one or more transverse dimensions D2 defined by the receptacles 112.

Other adjustments or selections can be made to yield a desired heating pattern of the contents of the cartridge 100. For example, in various embodiments, the wall thicknesses, number, and/or spacing of the receptacles 112 can be adjusted, and the ability of the receptacles 112 to bear the weight of the body 110 can be considered with respect to the same. In various embodiments, the cartridge 100 comprises no fewer than 5, no fewer than 10, no fewer than 15, no fewer than 20, no fewer than 25, or no fewer than 30 receptacles 112. The lengths of one or more of the receptacles 112 may be adjusted. In the illustrated embodiment, the receptacles 112 each defines a longitudinal length that is the same as that defined by the other receptacles 112, and the longitudinal length is greater than a longitudinal length defined by the body 110. Additionally, in the illustrated embodiment, each of the receptacles 112 is spaced from all of the remaining receptacles 112, which can allow heated fluid to circulate between any set of adjacent receptacles 112, or stated otherwise, heated fluid can circulate about a full periphery of each receptacle 112. Other arrangements are possible. For example, in some embodiments, a longitudinal length of the receptacles 112 can be less than a longitudinal length defined by the body 110.

In some embodiments, the sidewall 114 of the body 110 and one or more of the sidewalls 130 of the receptacles 112 comprise different types of materials. For example, in some embodiments, the sidewall 114 comprises 516 weathering steel (Corten steel), whereas the sidewalls 130 comprise A36 steel or stainless steel. In other embodiments, the sidewalls 114, 130 comprise the same type of material, such as A36 steel, weathering steel, or stainless steel. Any suitable material may be used, whether a metallic composition (e.g., a metal or metal alloy), a ceramic composition, and/or some other composition that can readily conduct heat and/or sustain high temperatures.

In some embodiments, the plastic feedstock 101 can comprise mixed plastic that includes trace amounts of non-plastic contamination. For example, the contamination may be of an external nature (e.g., water, foodstuffs, labeling, soil, paper, or cellulose waste) or may result from internal amendments (e.g., glass, metal, iron, bromine, and/or chlorine).

With reference generally to FIGS. 1-6, various embodiments of cartridges 100 can vary from those illustrated in the drawings. For example in some embodiments, plastic feedstock 101 is introduced into the cartridge 100 through a side of the body 110, rather than through the top thereof. The lid 104 may be positioned within the sidewall 114 of the body 110. In other or further embodiments, the lid 104 may be permanently attached to the body 110, such as via a hinge. In some embodiments, the support member 122 is omitted, and a seal may be formed with a heating plenum 200 via an underside of the lip 120.

Figure 7:
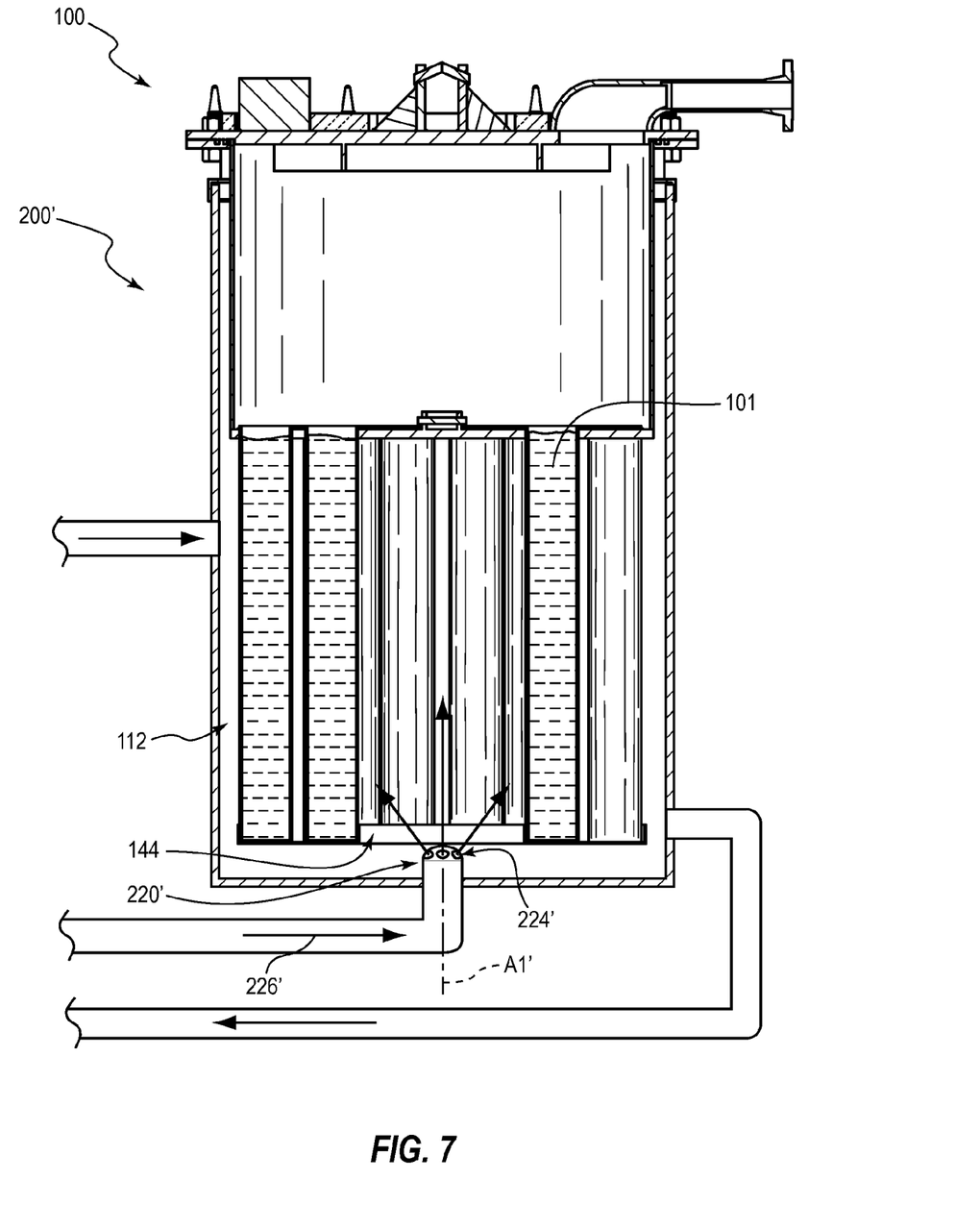
FIG. 7 is a cross-sectional elevation view of the cartridge of FIG. 1 having a quantity of plastic feedstock therein and shown positioned in another embodiment of a heating plenum.

FIG. 7 illustrates another embodiment of a heating plenum 200' with which the cartridge 100 can be coupled. The plenum 200' resembles the plenum 200 in many respects, but includes a base entrance fluid port 220' that differs from the base entrance fluid port 220 described above. In particular, the fluid port 220' is positioned below the receptacles 112 and does not extend into the open volume 144 defined by the inner receptacles 112. However, the fluid port 220' includes openings 224' similar to the openings 224 of the fluid port 220. One or more of the openings 224' are angled relative to an axis A1', or are parallel or collinear therewith, so as to direct heated fluid 226' into the open volume 144. As shown by two of the arrows exiting the port 220', the heated fluid 226 can be directed outwardly and into contact with the receptacles 112.

In the illustrated embodiment, a quantity of plastic feedstock 101 is shown in a melted state. The plastic feedstock 101 is shown prior to vaporization of an appreciable amount thereof so as to permit a meaningful comparison with the un-melted plastic feedstock 101 shown in FIG. 5. The same quantity of this particular variety plastic feedstock 101, which reduces in volume when melted, is shown in each of FIGS. 5 and 7.

Embodiments of the cartridges 100 and heating plenums 200, 200' described above may be used in a variety of plastic recycling systems. Certain of such systems are described hereafter as illustrative examples. The examples are not intended to limit the present disclosure, although the systems described herein may include independently patentable subject matter.

Figure 8:
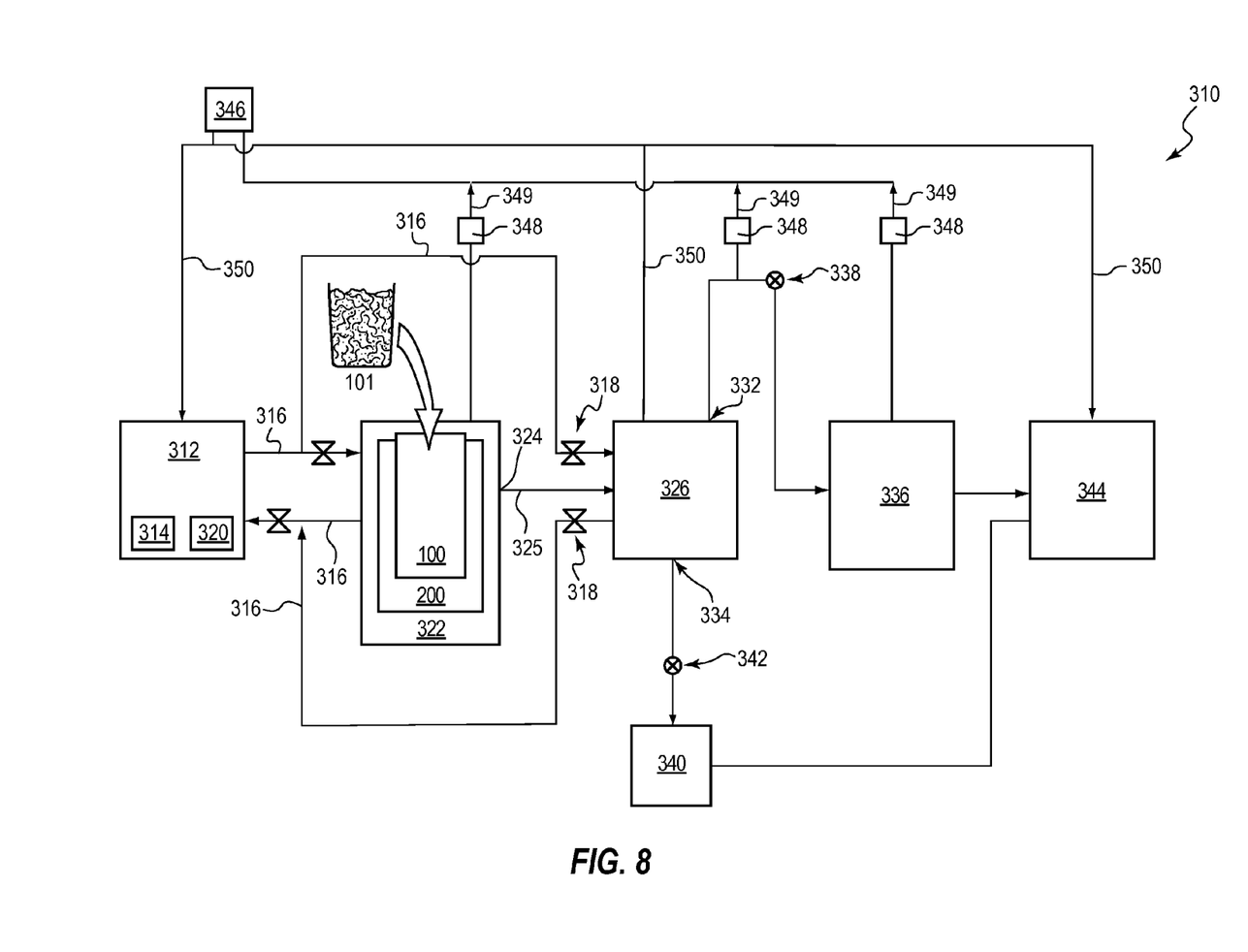
FIG. 8 is a schematic diagram of an embodiment of a plastic recycling system compatible with embodiments of cartridges, such as the cartridge shown in FIG. 1.

FIG. 8 represents a schematic diagram of a recycling system 310. The system 310 may be described generally as a system for recycling waste plastic materials that provides dynamic, real-time process control. The system can allow a user to easily process commingled sources of mixed waste plastic that may contain trace levels of non-plastic contamination. The system uses a controllable energy system and a vacuum (negative pressure) to control a third variable, namely, dwell time within the treatment chamber, to completely control the recycling process.

In particular, the system 310 provides a process for separately removing individual byproducts of the waste plastic such that the byproducts themselves may be marketable end products. Some of the individual by products removed by the present system include chlorine (found in polyvinylchloride plastics), bromine (utilized as a flame retardant in many plastics), water (found on wet feedstock), and the like.

Some embodiments of the system 310 described hereafter utilize specific and controlled heating patterns to melt a plastic feedstock 101 so as to remove gaseous forms of the constituent components of the feedstock 101 in phases. Embodiments of the cartridges 100 can allow for rapid heating to a desired temperature, which can provide for an energy efficient system 310. However, it is to be understood that embodiments of the cartridges 100 and heating plenums 200, 200' can be particularly well suited for use in other plastic recycling systems, such as those that employ rapid heating and vaporization of the plastic feedstock 101 without necessarily separating individual constituent components from each other in phases based on vaporization conditions within a cartridge 100.

With continued reference to FIG. 8, the system 310 includes a recirculating air or recirculating energy system 312 that may include a gas manifold/burner system 314, ductwork 316 to direct the flow of heated air, damper vents 318 capable of introducing or dispersing fresh air, exhaust air and supply air, and a variable-supply air fan 320 capable of metering the amount of air heated by burner system 314.

The system 310 may further include a process reactor 322, which can include one or more embodiments of the cartridge 100 and one or more embodiments of the heating plenum 200 described above. As previously discussed, embodiments of the cartridges 100 can have the ability to hold a vacuum, and may be exposed to heated air that circulates within a heating plenum 200. Energy contained in the air from the burner system 314 may be transferred to the contents of the cartridge 100. The process reactor 322 may include a vapor exit port 324 (e.g., the evacuation port 174 of the cartridge 100) that is connected directly to a vapor treatment vessel 326, such as a reflux heat exchanger, via piping 325.

The internal temperature of the vapor treatment vessel 326 may be controlled by the energy system 312 or a thermal fluid medium within the vapor treatment vessel 326, which may control the temperature of vessel 326 by transferring energy either into or out of vessel 326. The vapor treatment vessel 326 may be equipped with two exit ports: a top exit port 332 and a bottom exit port 334.

The top exit port 332 of the vapor treatment vessel 326 may be connected to a vapor scrubbing system 336 via a valved pipe train 338. A bulk oil collection vessel 340 may be connected via a valved pipe train 342 to the bottom exit port 334 of the vapor treatment vessel 326. A source of negative pressure, such as a pressure system, namely a vacuum system 344, may be connected to the vapor scrubber 336.

A process control system 346 may include computer operable instructions that may utilize the output 349 from chemical process feedback sensors 348 which may be connected to each of the processor reactor 322, the treatment vessel 326, and the scrubber 336. These sensors 348 may generate process feedback loops 350 that provide information to the recirculating energy system 312, the vapor treatment vessel 326, and the vacuum system 344 in order to control and modify the process on a real-time basis.

Illustrative methods of operation of the system 310 will now be described. Ground or chipped plastic material 101 is introduced into the cartridge 100. The plastic material 101 may be introduced by any means, such as by a screw auger (not shown) or the like. After the plastic material 101 is placed within cartridge 100, the cartridge 100 is sealed and vacuum-tested for seal integrity. The cartridge 100 may then be purged with an inert gas, such as nitrogen, and then a vacuum pressure pulled thereon by use of the vacuum system 344.

The recirculating energy system 312 is then activated, and the air surrounding the cartridge 100 within the heating plenum 200 is heated as it circulates around the cartridge 100 and returns to the burner chamber of the burner system 314. Controlling the amount of fresh air entering the energy system 312, the amount of hot exhaust air leaving the energy system 312, the intensity of the burner 314, and/or the flow rate of air through energy system 312 utilizing the damper vents 318 can allow the cartridge 100 to be subjected to a precise temperature profile. Additionally, as the cartridge 100 is heated, a variable pressure (positive or negative pressure) may be applied to the cartridge 100 using a pressure system, such as the vacuum system 344. Some embodiments may use specific temperature and pressure profiles to extract specific components from the feedstock at given temperature and pressure conditions, such that the constituent components of the feedstock material may be separated from each other as they are removed from the cartridge 100. In other embodiments, the feedstock is melted and vaporized quickly (e.g., the heating plenum 200 is maintained at a high temperature) without regard to a precise heating profile, and the vaporized material is removed from the cartridge 100 and subsequently processed in order to separate the constituent components of the feedstock material. In either case, waste plastic materials 101 may be treated and useful end products generated, such as cracked hydrocarbon material (which may be utilized as petroleum fuel), water, chlorine and bromine.

Figure 9:
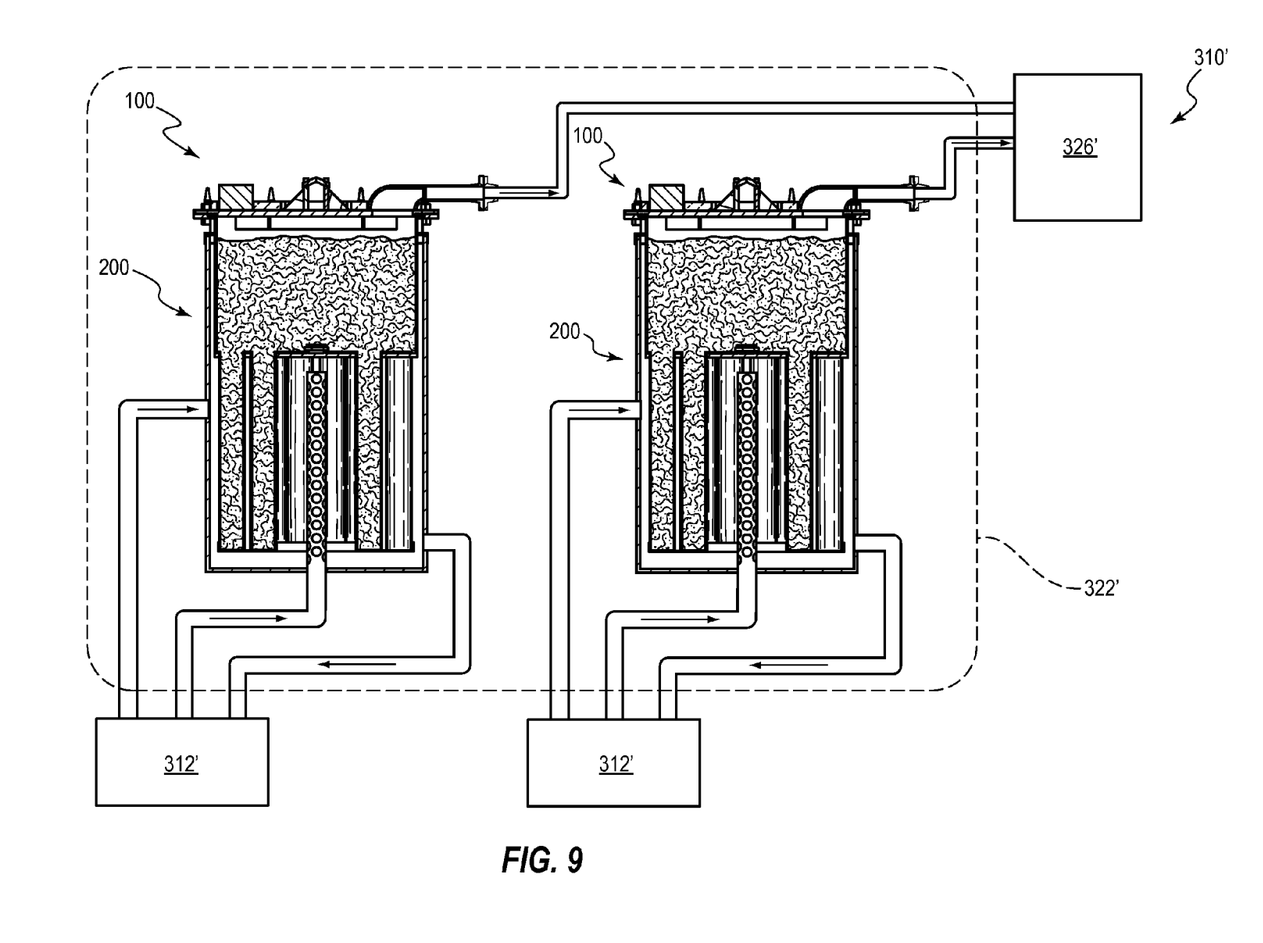
FIG. 9 is a schematic diagram of a portion of an embodiment of a plastic recycling system that includes multiple cartridges that can be heated simultaneously via separate heat sources and that can be evacuated simultaneously via a common vacuum system.

FIG. 9 illustrates a portion of another recycling system 310' that includes a process reactor 322'. In this embodiment, the process reactor 322' includes two sets of cartridges 100 coupled with heating plenums 200. Each heating plenum 200 is supplied with heated fluid by a different recirculating energy system 312'. However, gases removed from the cartridges 100 are delivered to a common vapor treatment vessel 326'. The gases removed from the cartridges 100 can be mixed with each other and treated simultaneously within the vapor treatment vessel 326'.

Figure 10:
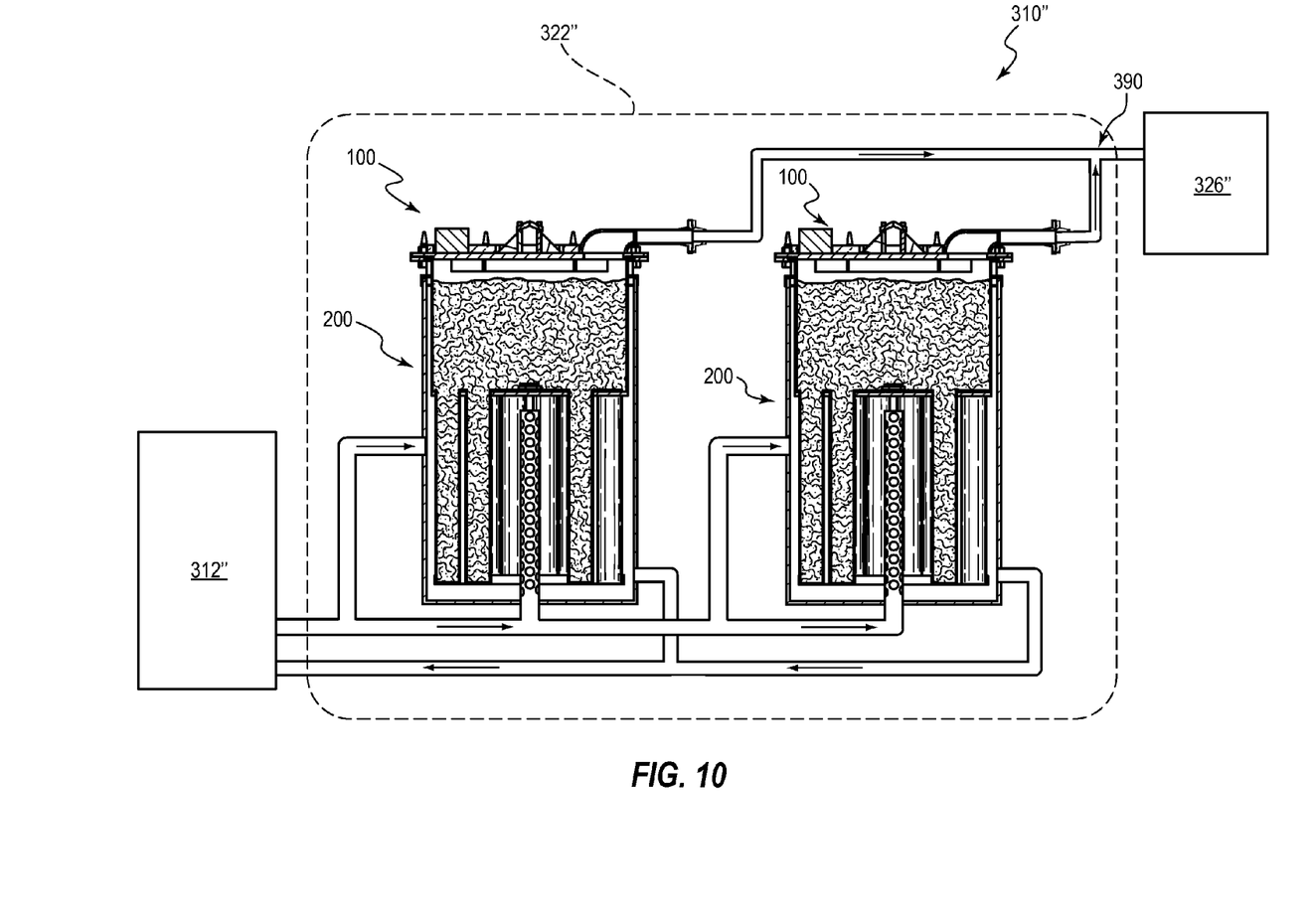
FIG. 10 is a schematic diagram of a portion of an embodiment of a plastic recycling system that includes multiple cartridges that can be heated simultaneously via a common heat source and that can be evacuated simultaneously via a common vacuum system.

FIG. 10 illustrates a portion of another recycling system 310" that includes a process reactor 322". As with the process reactor 322', the process reactor 322" includes two sets of cartridges 100 coupled with heating plenums 200. However, each heating plenum 200 is supplied with heated fluid by a common recirculating energy system 312". Gases removed from the cartridges 100 are delivered to a common vapor treatment vessel 326". As shown by the arrows exiting the cartridges 100, the gases are mixed prior to entering the vapor treatment vessel 326" at a manifold 390. Further embodiments of the recycling systems 310, 310', 310" can include any number of cartridges 100 and heating plenums 200.

Figure 11:
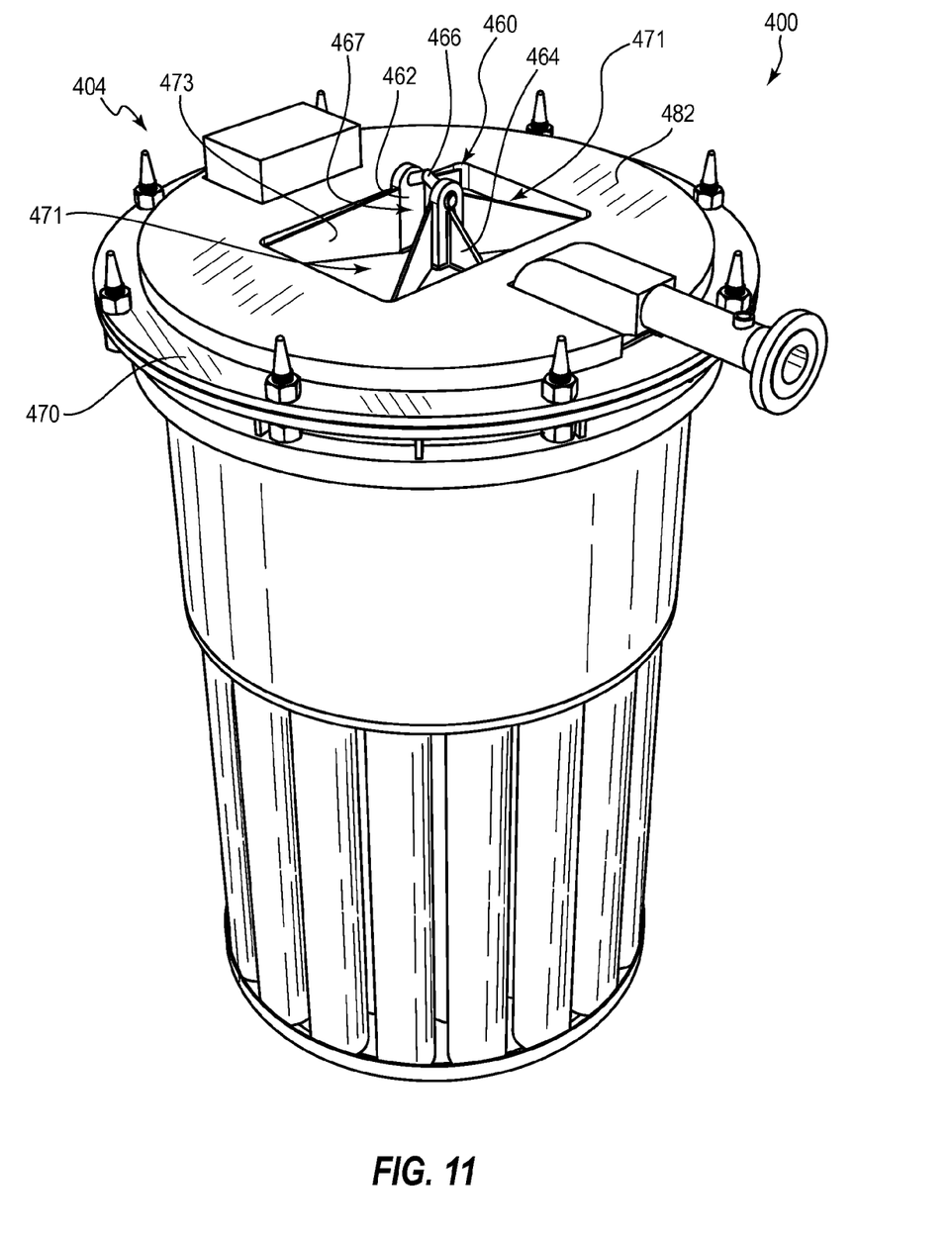
FIG. 11 is a perspective view of another embodiment of a cartridge configured for use in recycling plastic.

FIG. 11 illustrates another embodiment of a cartridge 400 that can be used in any of a variety of systems for recycling plastic. The cartridge 400 can resemble the cartridges 100 described above in certain respects. Accordingly, like features are designated with like reference numerals, with the leading digits incremented to "4." Relevant disclosure set forth above regarding similarly identified features thus may not be repeated hereafter. Moreover, specific features of the cartridge 400 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the cartridge 400. Any suitable combination of the features and variations of the same described with respect to the cartridge 100 can be employed with the cartridge 400, and vice versa.

The cartridge 400 can include a lid 404, which can include a lift attachment 460 that can be used to hoist the entire cartridge 400 when it is in a closed configuration. The lift attachment 460 can include two upward extending support plates 462, which each can be reinforced in a transverse or radially outward direction by a gusset 464. A pin 466 can extend transversely through the plates 462 and can be coupled with an attachment device (e.g., a hook) of a lifting device (e.g., a crane). In the illustrated embodiment, the lift attachment 460 is attached to a base plate 470 of the lid 404.

The lid 404 can further include one or more guidance channels 471 that are configured to guide or direct the attachment device of the lifting device into an opening 467 defined beneath the pin 466 and between the plates 462. The illustrated embodiment includes two such guidance channels 471, such that the attachment device can be readily guided toward the pin 466 from a variety of directions at either side of the opening 467. In the illustrated embodiment, each guidance channel 471 is defined by a pair of guidance plates 473, which narrow toward the opening 467. Moreover, in the illustrated embodiment, the guidance plates 473 increase in height toward the opening 467. In some embodiments, an end of a guidance plate 473 nearest the opening 467 can be higher than, or about the same height as, an underside of the pin 466. Other configurations are also contemplated.

In the illustrated embodiments, the lid 404 includes an insulation layer 482. In the illustrated embodiment, the guidance plates 473 are positioned within a rectangular, enlarged opening in the insulation layer 482 and are attached to the base plate 470. In other embodiments, the insulation layer 482 can be more tightly spaced from, or closer to (e.g., adjacent to), the guidance plates 473 and the support plates 462. Upper edges of the guidance plates 473 thus may protrude through the insulation layer 482.

It will be understood by those having skill in the art that changes may be made to the details of the above-described embodiments without departing from the underlying principles presented herein. For example, any suitable combination of various embodiments, or the features thereof, is contemplated. As an illustration, one or more of the heating plenums 200 within the systems 310, 310', 310" can be replaced with a heating plenum 200', a heating plenum that does not include a heated fluid base entrance port, or a heating plenum that includes only a base entrance port for introducing heated fluid therein.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

The invention claimed is:

1. A cartridge for use in recycling plastic, the cartridge comprising:
    a selectively sealable opening through which plastic feedstock can be introduced into an interior of the cartridge;
    a body that defines an upper cavity into which a plastic feedstock can be received;
    an evacuation port in fluid communication with the upper cavity, wherein the evacuation port is configured to permit removal of gas from the cartridge when the opening is sealed; and
    a plurality of elongated receptacles that extend away from the body, wherein each of the receptacles defines a lower cavity that is in fluid communication with the upper cavity of the body such that heated gas can freely move from the lower cavities into the upper cavity.

2. The cartridge of claim 1, wherein the cartridge is configured for use with a plastic feedstock that reduces in volume by a known amount when melted such that the cartridge is sufficiently large to receive a sufficient amount of un-melted plastic feedstock therein such that when the opening of the cartridge is sealed and the plastic feedstock is melted, the plastic feedstock fills at least about 75 percent of a volume defined by the plurality of receptacles.

3. The cartridge of claim 1, wherein a longitudinal length of one or more of the plurality of receptacles is greater than a height of the body.

4. The cartridge of claim 1, wherein a transverse dimension of the body is no less than about five times as large as one or more transverse dimensions defined by the plurality of receptacles.

5. The cartridge of claim 1, wherein the each of the plurality of receptacles extends away from the body in the same direction.

6. The cartridge of claim 1, wherein the number of receptacles is no fewer than five.

7. The cartridge of claim 1, further comprising a counterbalance positioned opposite the evacuation port.

8. The cartridge of claim 1, further comprising a lid that comprises a lift attachment and a guidance channel that is configured to direct a hook toward the lift attachment.

* * * * *